United States Patent

[11] 3,607,918

[72] Inventor Anthony T. Jurewicz
 Middlesex, N.J.
[21] Appl. No. 790,455
[22] Filed Jan. 10, 1969
[45] Patented Sept. 21, 1971
[73] Assignee Mobil Oil Corporation

[54] PREPARATION OF N,N-DIMETHYLTEREPHTHALAMIC ACID AND TEREPHTHALAMIDES FROM TEREPHTHALIC ACID AND ALIPHATIC AMIDES OR NITRILES
 6 Claims, No Drawings
[52] U.S. Cl. ...................................... 260/518 R,
 260/558 A
[51] Int. Cl. ...................................... C07c 103/33

[50] Field of Search ............................................ 260/558,
 518

[56] References Cited
 UNITED STATES PATENTS
 3,314,989 1967 Patterson et al. ............. 260/558

Primary Examiner—Henry R. Jiles
Assistant Examiner—Harry I. Moatz
Attorneys—Oswald G. Hayes, Andrew L. Gaboriault and Hastings S. Trigg ABSTRACT: Terephthalamide N-methyl derivatives are prepared by reacting terephthalic acid with lower alkyl cyanides or with lower alkanoic amides or N-methyl derivatives, in oleum solution, at atmospheric pressure, and at 25° C.–100° C.

PREPARATION OF N,N-DIMETHYLTEREPHTHALAMIC ACID AND TEREPHTHALAMIDES FROM TEREPHTHALIC ACID AND ALIPHATIC AMIDES OR NITRILES

BACKGROUND OF THE INVENTION

1. Field of the Invention

This invention relates to the preparation of amides. It is more particularly concerned with the preparing of terephthalamides and N-methyl derivatives from terephthalic acid and fatty acid amides or nitriles.

2. Description of the Prior Art

Terephthalamides have been prepared by reacting terephthaloyl chloride and an amine, or by reacting terephthalic acid and an amine. Both methods have disadvantages. The former requires the preparation of the acid chloride intermediate. The latter requires high pressure and temperatures, and the use of pressure equipment. It is a desideratum to prepare terephthalamides from readily available materials and without resort to pressure.

SUMMARY OF THE INVENTION

This invention provides a process for preparing terephthalamides and N-methyl derivatives thereof that comprises reacting terephthalic acid with lower alkyl ($C_1$-$C_3$) cyanides or with lower alkyl ($c_1$-$C_3$) alkanoic acid amides or N-methyl derivatives, in oleum solution, at 25°–100° C.

DESCRIPTION OF SPECIFIC EMBODIMENTS

One reactant in the process of this invention is terephthalic acid. This acid, usually prepared by catalytic oxidation of p-xylene, is readily available commercially.

The other reactants in the present process are lower ($C_1$-$C_3$) cyanides and lower ($C_1$-$C_3$) alkanoic acid amides and their N-methyl derivatives. These compounds are readily prepared and most are commercially available. These reactants are methyl cyanide (acetonitrile); ethyl cyanide (propionitrile); propyl cyanide (butyronitrile); formamide N-methylformamide; N,N-dimethylformamide; acetamide; N-methylacetamide; N,N-dimethylacetamide; propionamide; N-methylporpionamide; and N,N-dimethylpropionamide.

The process of this invention is carried out at atmospheric pressure and at temperatures between about 25° C. and about 100° C. Temperatures between about 75° C. and about 85° C. are preferred. Reaction time can vary between about 1 hour and about 10 hours. The solvent used in oleum having an $SO_3$ content between about 15 percent and about 8 percent, on a weight basis, i.e., 15 percent to 80 percent oleum. In general, the concentration of terephthalic acid in oleum can be between about 0.5 mole and about 7 moles per liter of oleum, depending upon the $SO_3$ content; the higher content of $SO_3$ dissolving more moles of terephthalic acid. The molar ratio of nitrile or amide to terephthalic acid is at least stoichiometric (2:1) up to about 4:1. Higher ratios can be used, but serve no useful purpose and unduly increase the amount of material to be handled.

EXAMPLE 1

Terephthalic acid (16.6 g., 0.1 mole) and N-methylacetamide (21.9 g., 0.3 mole) were charged to a 250 ml. round-bottom flask, along with 100 ml. of 30% $SO_3$ in $H_2SO_4$. The solution was heated at 80° C. for 300 minutes. The reaction mixture was cooled and poured onto 500 g. of ice. A precipitate was obtained. This was collected, washed with water, and dried. The yield of solid was 83% (16 g.). Analysis by infrared, NMR, and melting point (315–317-°) showed the structure to be N, N'-dimethyl terephthalamide.

EXAMPLE 2

Terephthalic acid (16.6 g. 0.1 mole) and acetamide (17.7 g., 0.3 mole) were charged to a 250 ml. round-bottom flask, along with 100 ml. of 30% $SO_3$ in $H_2SO_4$. The solution was heated at 80° C. for 360 minutes. The reaction mixture was cooled and poured onto 500g. of ice. A precipitate was obtained, which was collected, washed and dried. The yield was 95% (16.0 g.). Analysis by infrared and NMR showed the structure to be terephthalamide.

EXAMPLE 3

Acetonitrile (12.3 g., 0.3 mole) was charged to a 250 ml. round-bottom flask containing terephthalic acid (16.6 g., 0.1 mole) in 100 ml. of 30% $SO_3$ in $H_2SO_4$ at 20° C. After the addition was completed, the mixture was heated at 80° C. for 360 minutes. The reaction mixture was cooled and poured onto ice. A precipitate was obtained, which was collected, washed, and dried. The yield was 90% (14.9 g.). Analysis by infrared and NMR showed the structure to be terephthalamide.

EXAMPLE 4

Terephthalic acid (16.6 g., 0.1 mole) and formamide (13.8 g., 0.3 mole) were charged to a 250 ml. round-bottom flask, along with 100 ml. of 30% $SO_3$ in $H_2SO_4$. The mixture was heated at 110° C. for 360 minutes. The reaction mixture was cooled and poured onto ice. The precipitate was collected, washed, and dried. A 69% yield to terephthalamide was obtained.

EXAMPLE 5

N-Methylformamide (21.9 g., 0.3 mole) and terephthalic acid (16.6 g., 0,1 mole) were charged to a 250 ml. round-bottom flask, along with 100 ml. of 30 % $SO_3$ in $H_2SO_4$. The solution was heated at 80° C. for 360 minutes. The reaction mixture was cooled and poured onto ice. The precipitate was collected, washed, and dried. The yield of N, N'-dimethyl-terephthalamide was 83%.

EXAMPLE 6

N,N-Dimethylformamide (22.2 g., 0.3 mole) and terephthalic acid (16.6 g., 0.1 mole) were charged to a 250 ml. round-bottom flask, along with 100 ml. of 30% $SO_3$ in $H_2SO_4$. The reaction mixture was heated at 90° C. for 420 minutes. The solution was cooled and poured onto ice. Filtration, followed by extraction of the mother liquor with ether, and evaporation of the ether gave an 8% yield (1.5 g.) of N,N-dimethylterephthalamic acid.

EXAMPLE 7

N,N-Dimethylacetamide (26.4 g., 0.3 mole) and terephthalic acid (16.6 g., 0.1 mole) were charged to a 250 ml. round-bottom flask, along with 100 ml. of 30% $SO_2$ in $H_2SO_4$. The flask was heated to 110° C. for 400 minutes. The reaction was cooled and poured onto ice. Filtration, followed by extraction of the mother liquor with ether, and evaporation gave 36% yield of N,N-dimethylterephthalamic acid.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A process for preparing terephthalamide and N-methyl derivatives thereof and N,N-dimethylterephthalamic acid that comprises reacting terephthalic acid with a reactant selected from the group consisting of lower alkyl ($c_1$-$C_3$) acid amides, in 15 percent to 80 percent oleum solution, at 25–100° C., using between about 0.5 mole and about 7 moles terephthalic acid per liter of oleum and at least the stoichiometric amount of said reactant to terephthalic acid.

2. The process of claim 1, wherein said reactant is N-methylacetamide.

3. The process of claim 1, wherein said reactant is acetamide.

4. The process of claim 1, wherein said reactant is acetonitrile.

5. The process of claim 1, wherein said reactant is formamide.

6. The process of claim 1, wherein said reactant is N-methylformamide.

UNITED STATES PATENT OFFICE
CERTIFICATE OF CORRECTION

Patent No. 3,607,918                    Dated September 21, 1971

Inventor(s) Anthony T. Jurewicz

It is certified that error appears in the above-identified patent and that said Letters Patent are hereby corrected as shown below:

Column 1, line 18, change "pressure" to --pressures--

Column 1, line 27, change "($c_1-c_3$)" to --($C_1-C_3$)--

Column 1, line 40, after "formamide" should be --;--

Column 1, line 48, change "in" to --is--

Column 1, line 49, change "8" to --80--

Column 1, line 69, change "317-°" to --317°--

Column 2, line 67, change "($c_1-C_3$) to --($C_1-C_3$)--

Signed and sealed this 25th day of April 1972.

(SEAL)
Attest:

EDWARD M. FLETCHER, JR.            ROBERT GOTTSCHALK
Attesting Officer                   Commissioner of Patents